United States Patent [19]

Madsen et al.

[11] Patent Number: 4,672,247
[45] Date of Patent: Jun. 9, 1987

[54] SYNCHRONOUS OR STEPPING MOTOR WITH EQUAL-TORQUE STEPPING

[75] Inventors: Elmer W. Madsen, Bristol; Ping-Shih Wang, Cheshire, both of Conn.

[73] Assignee: North American Philips Corporation, New York, N.Y.

[21] Appl. No.: 815,346

[22] Filed: Dec. 31, 1985

Related U.S. Application Data

[63] Continuation-in-part of Ser. No. 686,873, Dec. 27, 1984, abandoned, Ser. No. 686,874, Dec. 27, 1984, abandoned, and Ser. No. 686,875, Dec. 27, 1984, abandoned.

[51] Int. Cl.$^4$ .................. H02K 37/02; H02K 37/10
[52] U.S. Cl. .................. 310/49 R; 310/154; 310/256; 310/261
[58] Field of Search .......... 310/49 R, 162, 156, 310/257, 268, 114, 256, 154, 261

[56] References Cited

U.S. PATENT DOCUMENTS

| | | | |
|---|---|---|---|
| 3,204,136 | 8/1965 | Kaiwa et al. | 310/49 R |
| 3,206,623 | 9/1965 | Snowdon | 310/49 R |
| 3,293,459 | 12/1966 | Kreuter et al. | 310/49 R |
| 3,757,147 | 9/1973 | Lyman, Jr. | 310/49 R |
| 3,801,842 | 4/1974 | Touchman | 310/49 R |
| 3,978,356 | 8/1976 | Spiesberger | 310/162 |
| 4,206,374 | 6/1980 | Goddijn | 310/49 R |
| 4,306,164 | 12/1981 | Itoh et al. | 310/49 R |

Primary Examiner—Patrick R. Salce
Assistant Examiner—D. L. Rebsch
Attorney, Agent, or Firm—F. Brice Faller

[57] ABSTRACT

A hybrid stepper motor having two alternately excited magnetic systems, one providing positions of 0° and 180°, and the other positions of 90° and 270°. To minimize position offset due to unequal flux through the two air gaps of the unexcited system, a nonmagnetic space is provided to reduce the relative difference in reluctance between the magnetic paths which include the two air gaps of the unexcited magnetic system.

6 Claims, 7 Drawing Figures

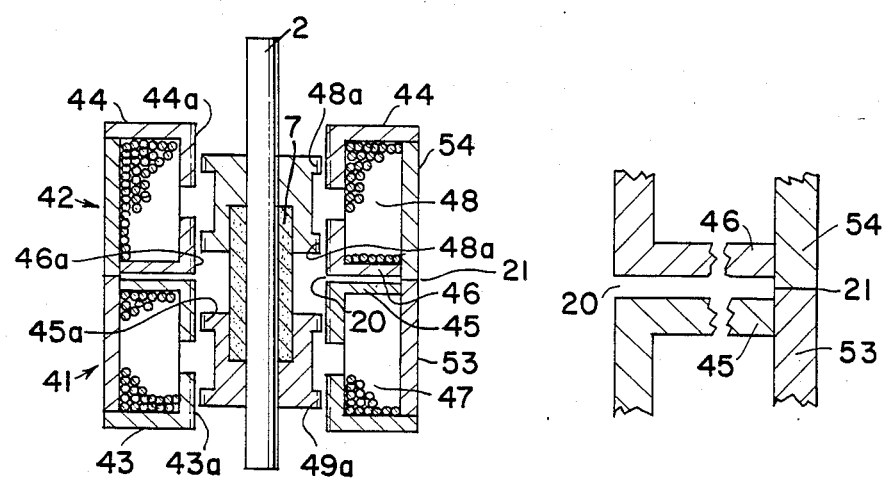
Fig. 4
Fig. 5
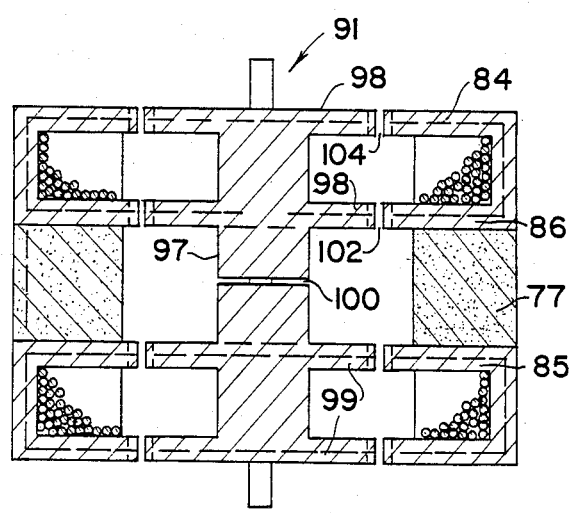
Fig. 7

SYNCHRONOUS OR STEPPING MOTOR WITH EQUAL-TORQUE STEPPING

This application is a continuation-in-part of, and combines the disclosures of, U.S. patent applications Ser. Nos. 686,873; 686,874; 686,875, all filed on Dec. 27, 1984 by the same inventors, all now abandoned.

BACKGROUND OF THE INVENTION

1. Field of the Invention

The invention relates to synchronous motors having a two-phase construction, and in particular to hybrid stepper motors.

Stepping motors can, in general, be considered as a type of synchronous motor in which the windings and magnetic structure have been proportioned such that continuous excitation of one winding is possible while not rotating, without overheating. Further, these motors are generally designed to operate in either direction, so that from any one specific rotor position, resulting from a selected excitation, stepping to an adjacent position in a selected direction is possible by appropriately selecting a change in the excitation of the coils. In order to provide high torque with a minimum of electrical power input, the motors known as hybrid stepper motors incorporate a permanent magnet to provide a field of fixed flux.

In synchronous motors designed for continuous rotation, an important condition for achieving a quality motor is often that the developed torque be quite constant as the shaft rotates, assuming a constant load torque. This is achieved by using a carefully balanced and arranged coil and pole piece structure. Because of the rotational symmetry for both (in a two-phase motor) or all three (in a three-phase motor) structures there is seldom any substantial difference between the torques when one or another of the coils is receiving maximum instantaneous excitation.

A similar requirement arises in the design of hybrid stepping motors, because a difference in the developed torque, depending upon which coil is energized, or in which direction (polarity) it is energized, can lead to a difference in the size of the angle by which the motor moves in consecutive steps. The simplest motor of this type, considered conceptually, would contain two fully independent electromagnetic systems sharing one shaft and a common stator housing. This structure is somewhat analogous to that shown in U.S. Pat. No. 3,855,486 which, however, does not use a permanent magnet. In the most common form of operation, at all times a selected one of the two systems would be energized, and the polarity of energizing the coil would determine which of two angles the rotor moves to. For example, energizing system A may produce stable rotor positioning at angles defined as 0° and 180°, while energizing system B produces rotor angles of 90° or 270°. Usually there are large numbers of rotor and stator teeth, so that 360°, as referred to above, refers to a simple fraction of one full revolution of the shaft, such as 1/50 revolution.

2. Description of the Prior Art

A first major structural simplification over the basic, two-independent-system motor described above is disclosed in U.S. Pat. No. 4,206,374. In this motor two independent magnetic systems are provided for controlled-excitation flux, but one fixed field flux source is shared by the systems.

Each system includes two rotor discs having a regular tooth pattern about their periphery; for a 1.8° stepping angle, each disc has 50 teeth. Coaxial about each of the rotor discs is a respective stator disc, having the same number of internal teeth. A simple annular stator coil is wound coaxially about the rotor axis, between the stator discs. Surrounding the coil, and in contact with the outer periphery of each stator disc of a system, is a tubular stator portion. Each of the four discs, the tubular portion, and a rotor piece between the rotor discs is made of a soft ferromagnetic material. Thus an exciting current flowing through one of the stator coils will produce flux flowing axially in a first direction in the tubular portion, radially inward through a stator disc and its teeth, across the air gap to the rotor teeth and radially inward, axially through the rotor piece in a direction opposite to the first direction, and radially outward through the other rotor disc, its teeth, the other air gap, the other stator disc teeth and the rest of the disc.

To provide two stable shaft positions, the rotor discs have their teeth in line, while the two stator discs of one stator section have a ½ tooth pitch angular shift. Thus the angular alignment of each of the longitudinally aligned rotor-stator disc pairs of one system differs by half a tooth pitch.

The two systems are identical, except that the alignment of the stator sections is shifted by ¼ tooth pitch, so that at a given shaft position, the teeth of one system are aligned tooth-to-tooth and tooth-to-space, while the other system has its rotor teeth angularly shifted ¼ of a tooth pitch from the stator teeth.

The two systems share a common fixed flux source: an axially magnetized annular stator magnet fitted between the two stator sections. A third soft magnetic rotor piece is located coaxially with the permanent magnet. Ideally, the fixed flux value, and that produced by the individual stator coil with rated current, are such that when one coil is energized, the fixed and coil fluxes almost cancel each other in the rotor-stator disc pair which are aligned tooth-to-space, and the combined flux in the pair which are tooth-to-tooth is just sufficient to saturate the teeth.

Thus with one coil energized, flux flows through the magnet, splits approximately equally between the two stator discs of the system whose teeth are shifted ¼ pitch each way from each other, flows through the third rotor piece, and then flows predominantly through the rotor-stator disc pair which is momentarily aligned tooth-to-tooth.

The structure just described is relatively easy to identify and analyze. At first glance, one would expect to see identical stepping distances between all four of the principal positions, corresponding to full excitation of the stator coils, alternately one at a time, and alternating polarity. However, upon careful measurement, a pattern of irregularity in step distances has been identified, but the reasons for this were not recognized.

An improvement to the structure described in the '374 patent is demonstrated in a motor marketed by N. V. Philips' Gloeilampenfabrieken, and further described in Philips Data Handbook Components and Materials. Alignment of the various discs is more quickly and accurately achieved during manufacturing. The rotor of that motor differs in that the two discs of one rotor section are mutually shifted ½ tooth pitch, while the two discs of one stator section are in line.

Improvement of the operating characteristics of a stepper motor, when individual stator systems are isolated from each other, is disclosed in the U.S. Pat. No. 3,855,486 referred to above. In this motor, however, it is desired that there be no flux flow between one stator system and another stator system. The desire is that all of the flux produced by one coil shall flow through each of the rotor-stator air gaps associated with that magnetic system, so that maximum torque is obtained. Clearly, also, in the three-phase motor disclosed in that patent, stray flux coupling to adjacent sections would provide a noticeable imbalance from the performance when the center section was energized in comparison with performance when either of the end sections was being energized instantaneously. This motor is thus quite different from the hybrid motor in which flux must flow from one stator section to the other.

An especially short, compact hybrid stepper motor is described in Netherlands Patent application No. 8402543, filed Aug. 20, 1984, to which U.S. patent application Ser. No. 672,021 filed Nov. 16, 1984 (now abandoned) corresponds. For maximum simplicity and compactness of construction, this motor utilizes a single axially magnetized permanent magnet in the rotor, for both systems. The rotor has two identical toothed discs, one to each side of the magnet, with the teeth of one disc aligned ¼ of a tooth pitch different from the other.

Each stator section is formed from two identical discs, each having two inwardly projecting sectors having teeth facing toward the rotor axis, the sectors each extending less than 90° around the rotor, and the sectors which are part of one stator disc being between the sectors of the other stator disc. A stator coil is wound around the rotor axis, and is disposed between the two discs forming one stator section. Axially extending cylindrical portions around the circumference of each disc function as the "back iron" for the flux resulting from excitation of that coil. The two stator sections are axially adjoining, so that each section has one outer disc, and one inner or middle disc. Thus the flux due to excitation of one section's coil may be thought of as extending radially outward through the first sectors of one disc; along the back iron; inward along the sectors of the other disc; across the air gap to the teeth of the rotor; angularly around the rotor to a location opposite the other (first) sector, and across the air gap to the first sectors. All the stator sectors which are axially in one line have their teeth aligned; but the teeth of one stator sector are disposed ½ tooth pitch, around the circumference, from the stator sectors to each side.

The field flux from the permanent magnet flows from one end face of the permanent magnet to the adjoining rotor disc, and then radially outward to the teeth of the stator section discs. Flux flowing to the sectors of the outer disc follows a path radially to the cylindrical portion, then axially along the circumferential back iron to the other stator section, and continues axially to the other outer disc, and radially inward to its air gap, across the gap to the other rotor section, and then axially back to the magnet.

Flux flowing to the inner teeth on the middle disc tends to flow axially to the middle disc of the other stator section, and then radially to the other rotor section.

While this structure seems quite symmetrical, it has been observed that there is a sufficient difference between the torque for one direction of first section coil current, and that for the other direction of coil current, so that for some applications the angular steps are insufficiently identical.

SUMMARY OF THE INVENTION

An object of the invention is to provide a simple motor construction which has essentially identical step distances for each direction of coil current.

Another object of the invention is to provide a stepper motor which comprises a minimum number of parts, which can easily be aligned during manufacture.

According to the invention, the reluctance of the field (permanent magnet) flux path is increased by providing a space which reduces the effect of coupling between adjacent stator discs of different stator sections, without affecting the reluctance of the path for flux flowing within each particular magnetic system due to current flow in that respective coil.

More particularly, in preferred embodiments of the invention in a hybrid stepping motor, a non-magnetic space or spacer is provided between the two middle discs, one from each stator section, while a direct magnetic path having only butt joints is provided between the two stator sections at the outer circumference of the middle discs or the two sections. In these embodiments, the permanent magnet is preferably a part of the rotor.

These embodiments provide substantially identical stepping angle, regardless of the polarity of the current through either of the coils, because the total magnetic flux carried by each of the stator discs of the unexcited section is substantially equal. The reason for this improved performance is that essentially all the flux crossing the air gap from the middle disc of the unexcited section to the rotor passes through the entire radial path length in the middle disc from its outer circumference. Flux passing through the air gap from the outer disc of the unexcited section to the rotor has only a slightly longer path through the stator iron, because of the length of the short axial path it travels from the region of the outer circumference of the middle disc to the outer circumference of the outer disc. By contrast, prior art motors having a butt joint between the adjacent middle discs experience a substantial flux linkage between portions of the middle discs that are relatively close to the stator teeth, or only part way out radially from the stator teeth to the outer circumferences of the two middle discs.

Motors according to these preferred embodiments offer substantially the same extent of improvement whether the stator sections are formed by discs or cups, and whether the butt joint connecting the magnetic path between the two stator sections is an axial path over a relatively narrow radial region near the outer circumference of the cups or discs, or whether there is an outer sleeve extending substantially over the entire distance between the outer discs of the two sections, with radial butt joints between the outer circumference of individual stator discs or cups. The invention thus offers the possibility of maximally improved performance regardless of the basic choice of stator iron construction.

In another aspect of the invention, the air gap flux (that is, flux traveling across the air gap from stator teeth to rotor teeth) for each of the two discs of the unexcited stator section is made relatively equal by providing an additional gap in the rotor, between the rotor teeth corresponding to each of the two stator sections. As a result of this increase in the total reluctance of the magnetic path followed by the fixed or field flux, the difference in reluctance between the path followed by flux passing through the outer disc, and that passing from one middle disc to the other at locations intermediate the stator teeth and the middle disc outer circumferences, is minimized on a relative basis.

Different structural embodiments of each of these aspects of the invention are shown in the drawing.

BRIEF DESCRIPTION OF THE DRAWING

FIG. 4 is a longitudinal sectional view of a second preferred embodiment in which each magnetic system is separated axially from the other, FIG. 5 is a sectional view on an enlarged scale of a portion of the stator sections of the embodiment of FIG. 4, showing the butt joint, FIG. 7 is a longitudinal cross section of a motor having a non-magnetic gap between the two sections of the rotor.

DESCRIPTION OF THE PREFERRED EMBODIMENTS

Figure 1:
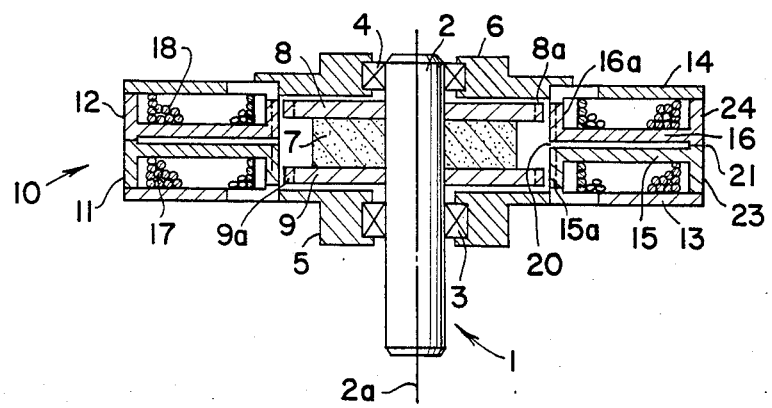
FIG. 1 is a longitudinal cross section of an embodiment of the invention in a short stepper motor having only two rotor discs.
Figure 3:
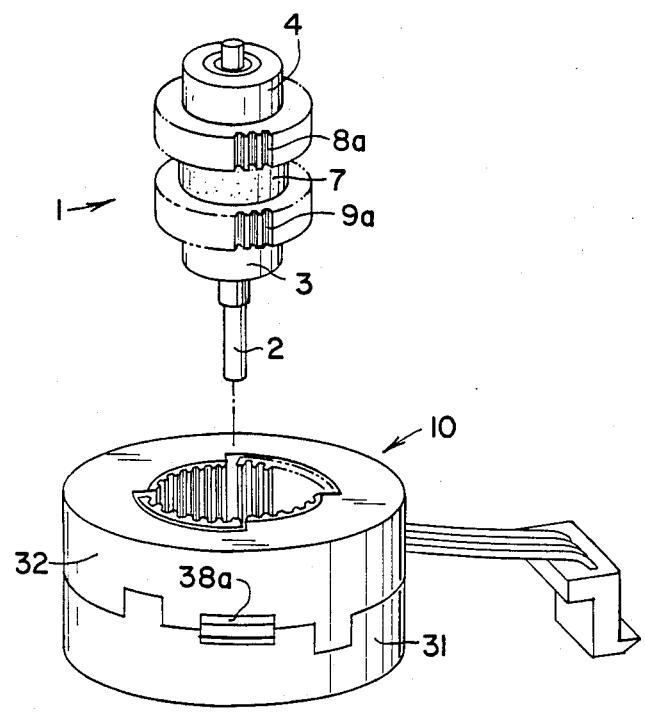
FIG. 3 is a perspective view showing the separate rotor and stator portions of the embodiment of FIG. 2.
Figure 2:
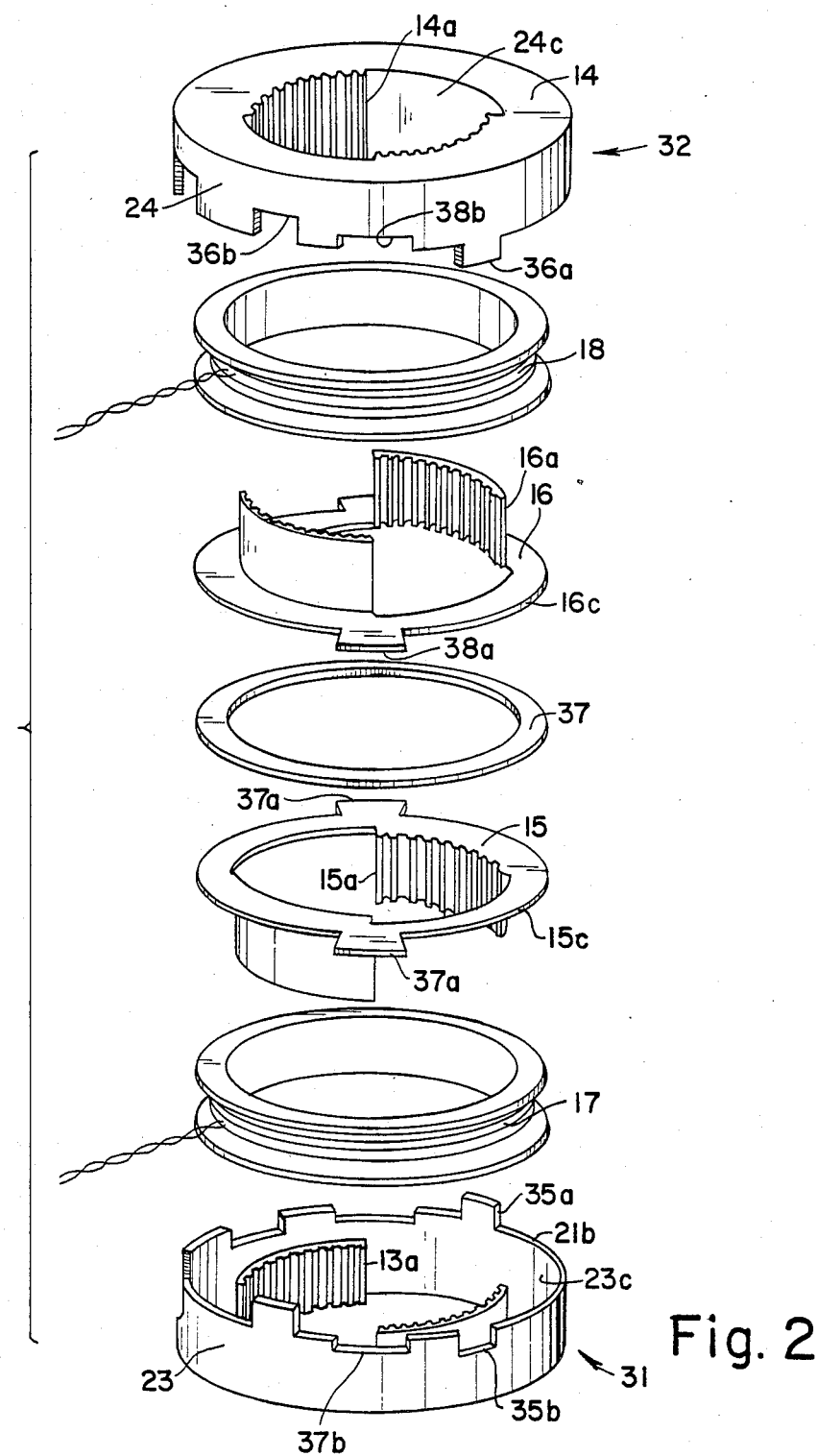
FIG. 2 is an exploded view of the principal stator parts of an embodiment similar to FIG. 1 but having radial butt joints.

The stepper motor shown in FIGS. 1, 2 and 3 is an improvement over a motor disclosed in copending U.S. patent application Ser. No. 672,021, filed Nov. 16, 1984, now abandoned. To achieve a very short length, while still having a high value of torque developed, two electrically excited magnetic systems alternately use the flux from one permanent magnet, while each system involves one rotor disc whose teeth cooperate with alternating sectors of an outer stator disc and a middle stator disc.

Referring to the drawing, the rotor 1 has a shaft 2 mounted in bearings 3, 4 which are retained in housing end caps 5, 6 respectively. The magnetic portion of the rotor 1 consists of an axially magnetized annular permanent magnet 7 against whose end faces rotor discs 8, 9 are tightly fitted. The circumference of each rotor disc has fifty equally spaced gear-like teeth 8a, 9a which are parallel to the axis 2a of the shaft 2. The discs 8, 9 have a precise relative angular alignment such that one disc is offset from the other by one-fourth of the tooth-to-tooth pitch.

The stator 10 consists of two sections 11, 12 which are substantially mirror symmetrical about a plane perpendicular to the shaft axis 2a. Each stator section has a corresponding outer disc 13, 14 and a respective middle disc 15, 16. Between the outer and middle discs of each section 11, 12 is a respective coil 17, 18 which is wound coaxially with the shaft axis 2a.

Extending from each of the middle stator discs are two sets of teeth 15a, 16a. Each set of teeth extends over slightly less than 90° about the shaft axis 2a and faces and has an angular spacing identical to that of the corresponding rotor teeth 8a, 9a.

Nested between the sets of middle disc teeth 15a are two sets of outer disc teeth 13a; each set of teeth 13a likewise extending over slightly less than 90° about the shaft axis 2a (FIG. 2). The teeth 13a have a tooth-to-tooth spacing and radial spacing from the rotor teeth 9a identical to that of the middle disc teeth 15a. However, the angular alignment of the outer disc teeth 13a with respect to the middle disc teeth 15a is such that there is a shift of precisely one half a tooth-to-tooth pitch, such that when ones of the teeth 9a are aligned tooth-to-tooth with the middle disc 15a, the teeth 9a which are opposite the set of outer disc teeth 13a are in tooth-to-space relationship.

Similarly, the stator section 12 has middle disc teeth 16a and outer disc teeth 14a having angular spacing identical to that of the rotor teeth 8a, each set of stator teeth 14a, 16a covering slightly less than 90° about the shaft axis 2a. The outer disc teeth 14a have an angular alignment exactly in line with the outer disc teeth 13a, and the middle disc teeth 16a are in exact angular alignment with the middle disc teeth 15a.

Except for the provision of two middle discs having sets of teeth extending in opposite axial directions, this motor is just like that described in the pending application Ser. No. 672,021 referred to above. In accordance with the invention, an axial space 20 is provided between the middle discs 15, 16 extending over substantially the whole radial length of the discs from the teeth outward to a butt joint 21 which is substantially at the outer circumference of the middle discs 15, 16. In the embodiment of FIG. 1, this space 20 is preferably an air space so that a closely fitting butt joint 21 is readily achieved. In the FIG. 1 embodiment, each middle disc 15, 16 includes a back iron portion 23, 24 which extends from the butt joint 21 to the respective outer disc 13, 14. Where considerations of frequency response make the use of a ferrite material or the like advantageous for the middle discs, this construction is readily produced by pressing the ferrite material into the desired configuration. However, if the middle discs are machined from a bar or plate of a soft ferromagnetic material such as steel, the need to maintain close tolerances on all of the machined surfaces will make the discs very expensive to manufacture.

To permit use of less expensive manufacturing techniques, the embodiment of FIGS. 2 and 3 is identical in configuration and function to that of FIG. 1 except for the formation of the back iron portions with respect to the middle and outer discs, and the technique of providing the nonmagnetic space between the middle discs. As shown most clearly in FIG. 2, each outer disc 13, 14 is part of a respective cup 31, 32 having the respective back iron portion 23, 24 formed integrally with the outer disc 13, 14. The cups 31, 32 are identical except for the interlocking teeth 35a, 36a and notches 35b, 36b. It will be clear to those of ordinary skill, however, that the orientation of the teeth and notches to the teeth 13a, 14a can be varied so that the cups 31, 32 are identical.

To provide accurate alignment of the middle disc teeth 15a, 16a, the middle disc 15 has two radially protruding tongues 37a aligned symmetrically with respect to the teeth 15a, and the middle disc 16 has similar tongues 38a likewise aligned with the teeth 16a. These tongues engage respectively in notches 37b, 38b in the cups 31, 32, these notches likewise being aligned with the outer disc teeth 13a, 14a. Thus, the circumferential surfaces 15c, 16c of the middle discs 15, 16 then form a butt joint with inner surfaces 23c, 24c of the back iron portions 23, 24, and the butt joint 21 is formed between edges 21b of the back iron portions 23, 24.

In accordance with the invention, to ensure that there is a nonmagnetic space between the middle discs 15, 16, a spacer 37 is fitted axially between the middle discs 15 and 16. The spacer 39 may be formed of a nonmagnetic metal, or, to reduce eddy current loss, may be formed of a plastic material.

The embodiment of FIG. 4 is like that of FIG. 1 with respect to manufacturing details. The primary difference is that the motor has a length substantially equal to or greater than the diameter, and the sets of stator teeth 43a, 44a, 45a, 46a are spaced axially along the rotor rather than in angular segments about the rotor. Thus the stator sections 41, 42 have respective outer discs 43, 44 and middle discs 45, 46. Each of the stator section discs has a complete set of 50 teeth 43a, 44a, 45a, 46a. The outer disc teeth 43a, 44a are aligned with each other, and the middle disc teeth 45a, 46a are aligned with each other but are half a tooth pitch spaced angularly with respect to the outer disc teeth. Aligned opposite the two sets of teeth 43a, 45a of the stator section 41 are two sets of rotor teeth 49a, and two sets of rotor teeth 48a are similarly aligned opposite the teeth 44a, 46a of stator section 42. The two sets of teeth 48a are in line with each other, but analogously to the embodiment of FIG. 1 are rotated angularly one-quarter of a tooth pitch with respect to the teeth 49a.

In accordance with the invention, and as shown at an increased scale in FIG. 5, a butt joint 21 is formed between the back iron portions 53, 54 of the stator sections 41, 42, while a space 20 is provided between the middle discs 45, 46. Thus it will clear that in this embodiment also, when the coil 47 is energized, only an insignificant flux fringing will occur between the middle discs 45, 46; and substantially all of the flux will pass through the butt joint 21 so that equal mounts of flux will be carried by the outer disc 44 and middle disc 46. Similarly, when coil 48 is energized, the two discs of stator section 41 will carry substantially equal flux.

Figure 6:
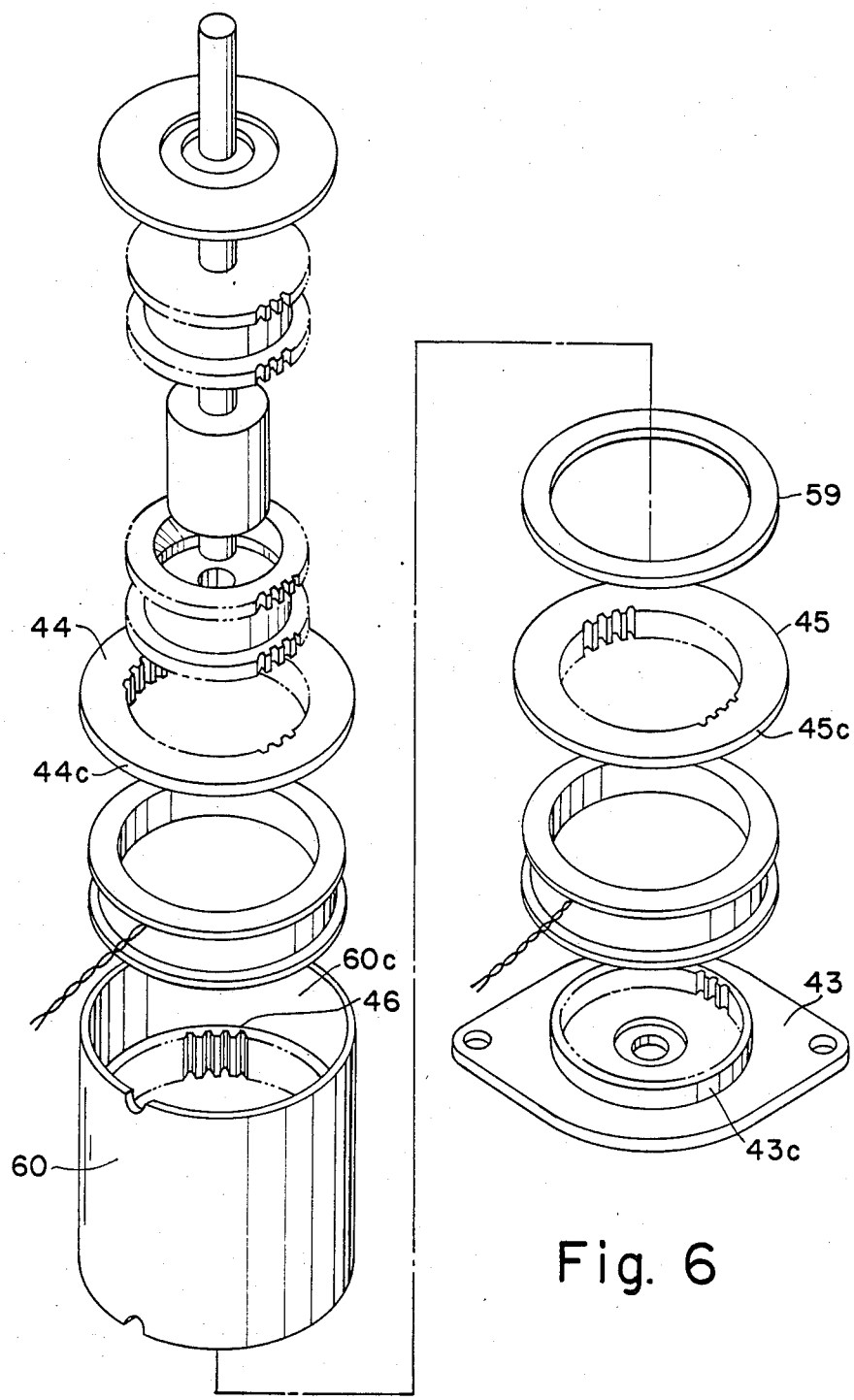
FIG. 6 is an exploded view of the principal stator parts of an embodiment similar to FIG. 4, having a continuous outer magnetic shell and radial butt joints.

The embodiment of FIG. 6, compared to that of FIGS. 4 and 5, is similar to the embodiment of FIG. 2 with respect to that of FIG. 1. A spacer 59 is placed between the middle discs 45, 46, while the entire back iron function is provided by an outer sleeve 60. The inner surface 60c of the sleeve 60 provides a butt joint magnetic connection to the circumferential surfaces 43c, 44c, 45c, and that (not shown) for the middle disc 46.

The embodiment of FIG. 7 differs from that of FIG. 4 in that the permanent magnet 77 is an annular axially magnetized mass which forms part of the stator and is located between the middle discs 85, 86 which are otherwise functionally the same as the middle discs 45, 46. This arrangement permits the use of an extremely powerful permanent magnet, so that a nonmagnetic axial gap 90 can be provided in the rotor 91. Rotor discs 98 at one end, and 99 at the other have teeth arranged exactly as the teeth 48a, 49a in FIG. 4; but instead of a permanent magnet 7 at the center of the rotor structure, a soft magnetic extension 97 extends between the middle rotor discs and the space 100. In this embodiment, because of the reluctance of the extra gap 100, the difference in reluctance between the magnetic circuit formed by a middle disc such as the disc 86 and the inner rotor disc 98, compared with the outer disc 84 and the outer rotor disc 98, represents a very small percentage change so that there will be substantially equal flux in the rotor-stator air gaps 102 and 104 when the coil at the other end of the motor is energized.

All of the embodiments described above operate according to the same principle. The outer disc and middle disc of one stator section, and the rotor teeth and disc or discs with which they cooperate, form one magnetic system. When the coil of one magnetic system is energized with a first polarity, such that a substantially saturation value flux is flowing through the outer disc of that stator section, then virtually no flux flows through the teeth of the rotor-stator air gap of the middle disc of that section. Thus the rotor should be aligned so that its teeth are precisely in tooth-to-tooth relationship with the outer disc of the energized section. However, if the flux through the two rotor-stator air gaps of the other, unenergized system are unequal, a torque will be developed tending to rotate the rotor very slightly in the direction of that set of teeth in the unenergized system which is carrying the higher flux. In this respect, it is noteworthy that at this time the two sets of air gaps of the unenergized system are geometrically offset 90° to each side of the correct rotor position. Thus any flux imbalance between those two air gaps will tend to offset the rotor position slightly.

While the invention has been described with respect to a stepper motor having many sets of teeth, so as only to rotate 1.8° per step, it will clear that the invention is equally applicable to a stepper having any other number of teeth, including the ultimate limit in which each disc has one tooth only, so that a full 90° of shaft rotation is obtained per step.

The reference throughout to "discs" in the rotor and stator does not imply that flat structures are required. Other shapes of end connection between the back iron (or shaft region) and the teeth may be used for manufacturing convenience, and are included in the meaning of "disc."

It will thus be clear that other physical motor arrangements, besides the embodiments shown here, may utilize the invention. So long as a difference in reluctance, between the two paths that include the rotor-stator air gaps of the unenergized system, is minimized, the inventive advantage is obtained. In the preferred embodiments having a nonmagnetic gap between the middle discs of the two stator sections, a butt joint or other connection between the back iron portions of the two sections is clearly preferable, but can be formed by one or more butt joints at any location that is well removed from the stator teeth of the middle discs. The discs and back iron portions can be formed from pressed magnetic powder materials, can be machined or stamped from solid or sheet stock, or formed in other desired fashions. For example, middle discs can be formed from a stamped material, having broached teeth, and the circumferential region of each of the middle discs can be bent away from the outer disc of that stator section, toward the other middle disc, so as inherently to form the desired gap without use of any additional element or part.

Rather than having interlocking teeth and notches to align stator cups, the cups can have plain, butting open ends, or even overlapping open ends. The stator discs and cups can then be aligned using a jig which uses the stator teeth for accurate registration, and the cups can be welded or cemented together. An embodiment like that of FIG. 6 could instead use two cups and two middle discs, or four equal cups rather than a single sleeve.

Thus these and other variations which become known to those of ordinary skill in the art fall within the spirit of the invention.

What is claimed:

1. An electric motor, comprising:

two coaxially arranged adjacent stator sections, each section comprising an outer disc, a middle disc and a stator coil disposed therebetween, said middle discs being adjacent one another, and a rotor comprising a shaft having an axis, mounted for rotation coaxially within said stator sections, and a plurality of rotor discs, each rotor disc being disposed concentrically with a stator section, each of said discs having a plurality of teeth, equiangularly spaced so as to define a tooth-to-tooth pitch, said pitch being identical for all said discs, teeth on a rotor disc being aligned to cooperate with respective teeth on a stator disc aligned therewith, defining a rotor-to-stator air gap, at least one rotor disc and a stator section associated therewith forming a magnetic system having two rotor-to-stator air gaps, and a permanent magnet mounted coaxially on said shaft between the rotor disc which cooperates with the middle disc of one stator section and the rotor disc which cooperates with the middle disc of the other stator section, said magnet being axially magnetized to provide a constant magnetic flux which passes along a path through said plurality of rotor discs, across one of said rotor-to-stator air gaps, through each of said stator sections, and across another rotor-to-stator air gap to the rotor, a non-magnetic gap between adjacent stator middle discs, said gap extending radially outward from the vicinity of the stator teeth of said middle discs to a butt joint adjacent the circumference of said middle discs, and through which said constant flux passes between said sections, said gap raising the reluctance of the flux path for said constant magnetic flux without changing the reluctance of either system, thereby minimizing difference in flux passing across the two rotor-to-stator air gaps of a magnetic system whose coil is unenergized when the other coil is energized and said rotor is in a stable position with respect to the teeth of the discs of the stator section whose coil is energized, said butt joint providing low reluctance path means between said adjacent stator sections.

2. A motor as in claim 1 wherein said middle discs directly abut each other at said butt joint.

3. A motor as in claim 1 wherein said magnet is received in said rotors.

4. A motor as claimed in claim 1, characterized in that each of said stator discs has two sets of teeth, each set extending over an arc of less than 90° about said axis, the teeth of the two stator discs of one stator section and the teeth of a single rotor disc forming part of one magnetic system being disposed in a plane perpendicular to said axis.

5. A motor as in claim 4 wherein said outer discs each are formed integrally with a cylindrical peripheral portion which directly abuts the cylindrical peripheral portion of the other said outer disc.

6. A motor as in claim 5 wherein said outer discs including their respective cylindrical peripheral portions are substantially identical.

* * * * *